No. 749,960. PATENTED JAN. 19, 1904.
H. D. DODD.
RICE CULTIVATOR.
APPLICATION FILED MAY 14, 1903.
NO MODEL.
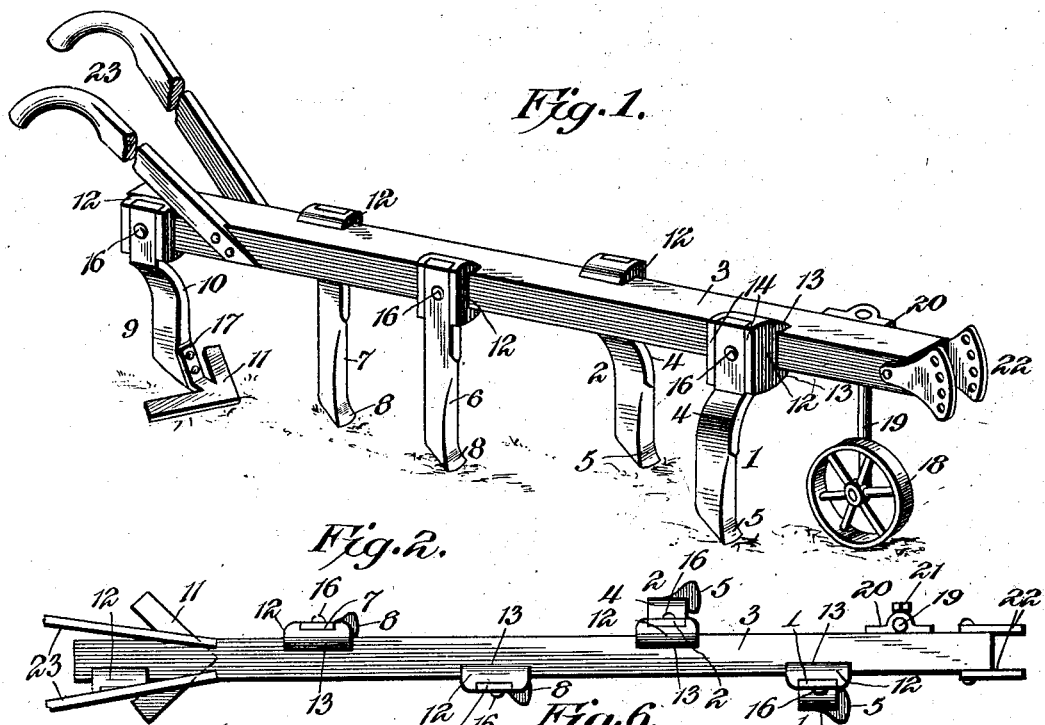
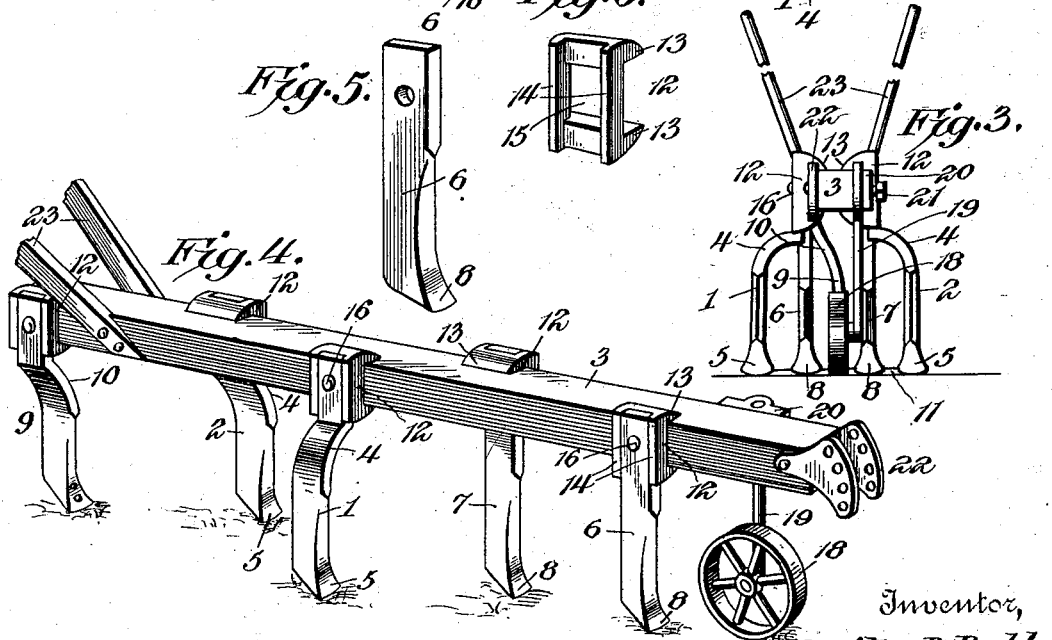
Witnesses
Howard W. Orr
Inventor,
Hamilton D. Dodd,
By E. G. Siggers
Attorney No. 749,960. Patented January 19, 1904.

UNITED STATES PATENT OFFICE.

HAMILTON D. DODD, OF WALTERBORO, SOUTH CAROLINA, ASSIGNOR OF ONE-HALF TO D. LAWRENCE SMITH, OF WALTERBORO, SOUTH CAROLINA.

RICE-CULTIVATOR.

SPECIFICATION forming part of Letters Patent No. 749,960, dated January 19, 1904.

Application filed May 14, 1903. Serial No. 157,147. (No model.)

*To all whom it may concern:*

Be it known that I, HAMILTON D. DODD, a citizen of the United States, residing at Walterboro, in the county of Colleton and State of South Carolina, have invented a new and useful Rice-Cultivator, of which the following is a specification.

The invention relates to improvements in rice-cultivators.

The object of the present invention is to improve the construction of rice-cultivators and to provide a simple and comparatively inexpensive one designed for cultivating rice as grown in North Carolina, South Carolina, and Georgia, where the soil is dry, hard, and crusty and where after the rice is planted the land is flooded and maintained in such condition until the rice is about two inches high. The land is then drained and a hard dry crust forms.

A further object of the invention is to provide a cultivator capable of breaking up this hard crust without covering the rice-plants.

Also the invention has for its object to provide a rice-cultivator adapted to be arranged for working the soil either toward or away from the rice-plants.

With these and other objects in view the invention consists in the construction and novel combination and arrangement of parts hereinafter fully described, illustrated in the accompanying drawings, and pointed out in the claim hereto appended, it being understood that various changes in the form, proportion, size, and minor details of construction within the scope of the claim may be resorted to without departing from the spirit or sacrificing any of the advantages of the invention.

In the drawings, Figure 1 is a perspective view of a rice-cultivator constructed in accordance with this invention, the teeth being arranged for working the soil toward the plants. Fig. 2 is a plan view of the same. Fig. 3 is a front elevation thereof. Fig. 4 is a perspective view, the cultivator-teeth being arranged for working the soil away from the plants. Fig. 5 is a detail view of one of the cultivator-teeth. Fig. 6 is a detail view of one of the clips for securing the teeth to the beam.

Like numerals of reference designate corresponding parts in all the figures of the drawings.

1 and 2 designate similar cultivator-teeth located at opposite sides of a beam 3 and arranged at different points on the same and having outwardly-curved standards, which are bent or bowed at 4 to offset their lower soil-engaging end 5 from the plane of the beam 3, as clearly shown in Fig. 3 of the drawings. The bend 4 is located between the ends of the cultivator-teeth 1 and 2, and the upper portions of the shanks of the teeth are straight and the lower portions below the bend are substantially straight. The lower engaging portions or ends 5 of the teeth are beveled at the rear and extended and beveled at the front to form cutting edges.

The cultivator is also provided with teeth 6 and 7, located at opposite sides of the beam 3 in rear of the teeth 1 and 2, and these cultivator-teeth 6 and 7 are provided with straight shanks and are slightly offset from opposite sides of the longitudinal center of the cultivator. The lower engaging ends 8 of the teeth 6 and 7 are constructed substantially the same as those of the teeth 1 and 2.

A soil-engaging device or tooth is arranged at the rear end of the beam and is provided with a standard or shank 9, having an inward bend 10 extending beneath the beam and arranging the lower portion of the shank or standard directly beneath the longitudinal center of the beam 3. The rear cultivating device may be provided with an engaging end similar to the other teeth, as illustrated in Fig. 4 of the drawings, or it may be provided with a sweep 11, as shown in Figs. 1 and 2. The cultivator-teeth 7 and 8 immediately in advance of the sweep are located each a short distance at opposite sides of the longitudinal center of the beam, and the other cultivator-teeth 1 and 2 are located a greater distance from the beam. The teeth operate in different planes, and when they are arranged as shown in Figs. 1 and 2, with the outwardly-bent teeth in advance, the cultivator is adapted to work the soil toward the plants, and when the straight teeth are arranged in advance of the outwardly-bent teeth the cultivator is adapted to work the soil away from the plants.

The shanks or standards of the cultivator-teeth are connected with the beam by clips 12, constructed of suitable metal and provided with inwardly-extending upper and lower flanges 13 and outwardly-extending vertical flanges 14. The inwardly-extending flanges, which are located at the top and bottom of the clip, are adapted to receive the beam 3 and engage the upper and lower faces thereto. The vertical flanges 14, which are located at opposite sides of the clip, are adapted to receive and brace the straight upper portions of the shanks or standards of the cultivator-teeth. The clips are provided with openings 15 to receive suitable fastening devices 16 for securing the cultivator-teeth and the clips to the beam.

In cultivating rice in North Carolina, South Carolina, and Georgia the land is flooded and kept under water until the rice is about two inches high. The water is then drained off, and when the land dries a hard crust forms on the surface. This crust must be broken and the land stirred without covering the rice. The cultivator teeth or cutters 1, 2, 6, and 7 are adapted to slice the crust, and the sweep, which is provided with flat rearwardly-diverging blades, follows the teeth or colters and stirs the soil between the rows without covering the rice-plants. By arranging the cultivator-teeth or colters alternately at opposite sides of the beam and at different points on the same the cultivator is prevented from gathering trash.

The rear shank or standard, which carries the sweep, has its lower end preferably shaped similar to the engaging lower ends of the cultivator-teeth or colters, so that it is only necessary to remove the sweep when it is desired to have a colter or tooth at the back of the cultivator. The sweep is provided with a central extension or attaching portion 17, which conforms to the configuration of the engaging lower end of the rear colter or cultivator-tooth and which is secured to the same.

The cultivator is provided in advance of the colters or cultivator-teeth with a gage-wheel 18, mounted on a journal of a rod or stem 19, which is adjustably secured to the cultivator-beam by a clamp 20, consisting of a plate provided with a vertical opening and having a clamping-screw 21. The rod or stem extends into the opening of the plate and is engaged by the clamping-screw.

The cultivator is provided at the front end of the beam with a suitable clevis 22, and it has a pair of handles 23 at the rear end of the beam, as shown.

What I claim is—

A cultivator comprising a beam, a series of cultivator-teeth located alternately at opposite sides of the beam, one of the teeth having an inwardly-bent shank or standard extending to a point directly beneath the beam and the other teeth being provided with outwardly-curved standards, whereby they are offset different distances from the center of the beam, the outwardly-curved standards being interchangeable, a sweep provided with means for detachably securing it to the tooth having the inwardly-bent standard, and clips securing the standards to the beam, substantially as described.

In testimony that I claim the foregoing as my own I have hereto affixed my signature in the presence of two witnesses.

HAMILTON D. DODD.

Witnesses:
P. M. MURRAY,
C. C. TRACY.